(12) United States Patent
Murota et al.

(10) Patent No.: US 9,519,059 B2
(45) Date of Patent: Dec. 13, 2016

(54) LIMITED-AREA REFLECTION TYPE OPTICAL SENSOR AND ELECTRONIC DEVICE

(71) Applicant: OMRON Corporation, Kyoto-Shi (JP)

(72) Inventors: Masayuki Murota, Shiga (JP); Yoshitaka Taishi, Shiga (JP); Hayami Hosokawa, Kyoto (JP); Masashi Sugimoto, Osaka (JP)

(73) Assignee: Omron Corporation, Kyoto (JP)

( * ) Notice: Subject to any disclaimer, the term of this patent is extended or adjusted under 35 U.S.C. 154(b) by 135 days.

(21) Appl. No.: 14/507,289

(22) Filed: Oct. 6, 2014

(65) Prior Publication Data

US 2015/0108332 A1 Apr. 23, 2015

(30) Foreign Application Priority Data

Oct. 21, 2013 (JP) .................................. 2013-218668

(51) Int. Cl.
| | | |
|---|---|---|
| *G01V 8/12* | (2006.01) | |
| *G01S 17/08* | (2006.01) | |
| *G01S 17/02* | (2006.01) | |
| *G01S 7/481* | (2006.01) | |

(52) U.S. Cl.
CPC ................ *G01S 17/08* (2013.01); *G01S 7/481* (2013.01); *G01S 17/026* (2013.01); *G01V 8/12* (2013.01)

(58) Field of Classification Search
CPC ........ G01S 17/08; G01S 17/026; G01S 7/481; G01V 8/12
See application file for complete search history.

(56) References Cited

U.S. PATENT DOCUMENTS

2016/0097843 A1* 4/2016 Nakamura ............ G01S 7/4814
250/221

FOREIGN PATENT DOCUMENTS

| EP | 0 384 353 A2 | 8/1990 |
|---|---|---|
| EP | 1 408 343 A1 | 4/2004 |
| EP | 2 000 373 A2 | 12/2008 |
| JP | 06-0241783 A | 9/1994 |

OTHER PUBLICATIONS

Extended European Search Report for Application No. 14188307.4, issued May 7, 2015 (8 pages).

* cited by examiner

*Primary Examiner* — Tony Ko
(74) *Attorney, Agent, or Firm* — Nutter McClennen & Fish LLP

(57) ABSTRACT

There is provided a limited-area reflection type optical sensor having an emitted light lens and a reflected light lens. An opposite-light-receiver-side portion opposite to a light receiver side constitutes a first curvature surface having a first curvature while a light-receiver-side portion on the light receiver side with respect to the opposite-light-receiver-side portion constitutes a second curvature surface having a second curvature smaller than the first curvature in the emitted light lens provided in an optical path of the emitted light. An opposite-light-emitter-side portion opposite to a light emitter side constitutes a fourth curvature surface having a fourth curvature while a light-emitter-side portion on the light emitter side with respect to the opposite-light-emitter-side portion constitutes a fifth curvature surface having a fifth curvature smaller than the fourth curvature in the reflected light lens provided in an optical path of the reflected light.

13 Claims, 15 Drawing Sheets

- Detected area (on area) (object sensing limited area S)
- Undetected area (off area)

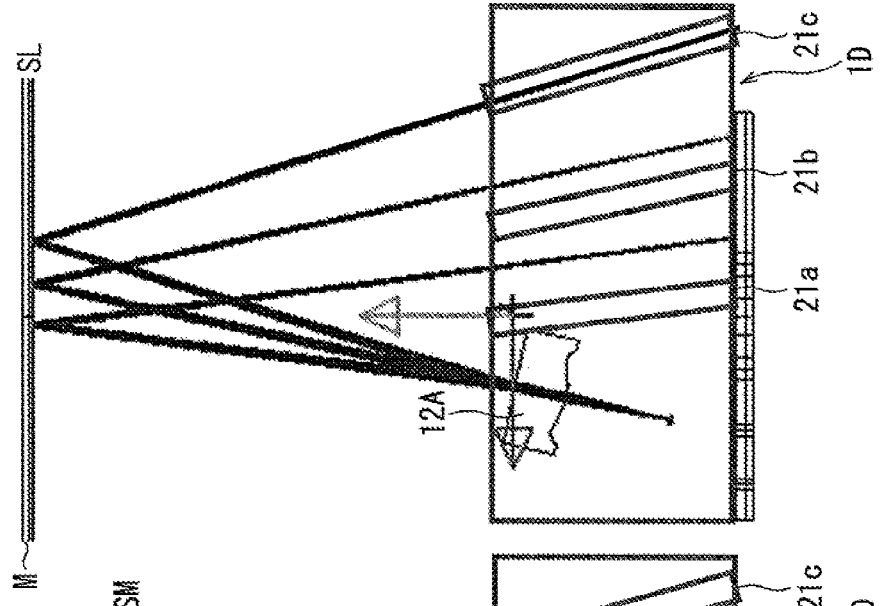

LIMITED-AREA REFLECTION TYPE OPTICAL SENSOR AND ELECTRONIC DEVICE

CROSS-REFERENCE TO RELATED APPLICATION

This application is based on Japanese Patent Application No. 2013-218668 filed with the Japan Patent Office on Oct. 21, 2013, the entire contents of which are incorporated herein by reference.

BACKGROUND

The present invention relates to a limited-area reflection type optical sensor in which a sensing area of an object is limited and an electronic device.

Conventionally, a limited-area reflection type optical sensor in which a sensing area of an object is limited is known as an optical sensor that detects whether the object exists at a predetermined position.

As illustrated in FIGS. 16A and 16B, a limited-area reflection type optical sensor 100 includes a light emitting element 101 and a light receiving element 102. In the light emitting element 101 and the light receiving element 102, an angle between the optical axes are set such that the object sensing limited area S is irradiated with the light emitted from the light emitting element 101, and such that the light receiving element 102 can receive the light reflected from the object, the light reflected from the object intersecting the emitted light only in the object sensing limited area S. When the object passes through the object sensing limited area S indicated by a hatch, the light reflected from the object is detected by the light receiving element 102 to determine the object.

Particularly, in the limited-area reflection type optical sensor 100, in the case that the object exists in the object sensing limited area S of distances LL2 to LL4 from the limited-area reflection type optical sensor 100, the emitted light from the light emitting element 101 is specularly reflected by the object, and the specularly-reflected light is incident to the light receiving element 102. However, a determination that the object does not exist is made in the case that the object exists out of the object sensing limited area S of the distances LL2 to LL4. Accordingly, a range of the distances LL2 to LL4 becomes an object detection range. Thus, in the limited-area reflection type optical sensor 100, the light receiving element 102 obtains a signal in the case that the object reaches the object sensing limited area S of the distances LL2 to LL4, whether the object exists is determined based on the signal.

At this point, in the limited-area reflection type optical sensor 100, in the case that the emitted light and the reflected light do not have spread, a distance between an operation level at which the object is detected to output a detection signal and a non-operation level at which the object moves to become a non-detection state is small and an influence of a background decreases. One of features of the limited-area reflection type optical sensor 100 is that a detection distance can be set by changing an angle between optical axes of the light emitting element 101 and the light receiving element 102.

However, for example, the conventional limited-area reflection type optical sensor 100 is used to detect the approaching object to stop the object at a given position. Therefore, as illustrated in FIGS. 16A and 16B, the emitted light and the reflected light is formed at the distance LL4 which is the position separated from the limited-area reflection type optical sensor 100.

However, in the conventional limited-area reflection type optical sensor, there is a problem in that the detection range is not wide.

For example, Japanese Unexamined Patent Publication No. 6-241783 discloses an optical sensor 200 that can widen the detection range. In the optical sensor 200, as illustrated in FIG. 17, plural reflection type optical sensors 201A to 201D are provided in parallel in order to detect surfaces to be measured A to D at a detection position P, and the surfaces to be measured A to D are separately detected by the reflection type optical sensors 201A to 201D. In order to detect the surfaces to be measured A to D, the optical sensor 200 includes the reflection type optical sensors 201A to 201D, projectors 202, and optical receivers 203, respectively. As a result, the detection range can be widened.

However, in the optical sensor 200 disclosed in Japanese Unexamined Patent Publication No. 6-241783, unfortunately the device is enlarged because the sensors are provided according to the number of surfaces to be measured. When the sensors are installed near each other, unfortunately the adjacent sensors interfere with each other to generate a malfunction.

An object of the invention is to provide a simple-configuration limited-area reflection type optical sensor that can accurately detect the object, in which the distance to the surface to be measured changes, by widening the detection range in a far-and-near direction and an electronic device.

SUMMARY

In an embodiment, there is provided a limited-area reflection type optical sensor configured to irradiate an object sensing limited area with emitted light from a light emitter and receive reflected light from an object existing in the object sensing limited area, the optical sensor comprising:
an emitted light lens or a reflected light lens;
wherein the emitted light lens comprises:
an opposite-light-receiver-side portion opposite to a light receiver side constituting a first curvature surface comprising a first curvature while
a light-receiver-side portion on the light receiver side with respect to the opposite-light-receiver-side portion constitutes a second curvature surface comprising a second curvature smaller than the first curvature in the emitted light lens provided in an optical path of the emitted light;
wherein the reflected light lens comprises:
an opposite-light-emitter-side portion opposite to a light emitter side constituting a fourth curvature surface comprising a fourth curvature while
a light-emitter-side portion on the light emitter side with respect to the opposite-light-emitter-side portion constitutes a fifth curvature surface comprising a fifth curvature smaller than the fourth curvature in the reflected light lens provided in an optical path of the reflected light.

BRIEF DESCRIPTION OF THE DRAWINGS

FIGS. 14A, 14B, and 14C are front views illustrating light receiving states of plural phototransistors in a limited-area reflection type optical sensor according to an embodiment;

DETAILED DESCRIPTION

In the following embodiments, there is described a simple-configuration limited-area reflection type optical sensor that can accurately detect the object, in which the distance to the surface to be measured changes, by widening the detection range in a far-and-near direction and an electronic device.

An embodiment of the invention will be described below with reference to FIGS. 1 to 9.

Figure 2A:
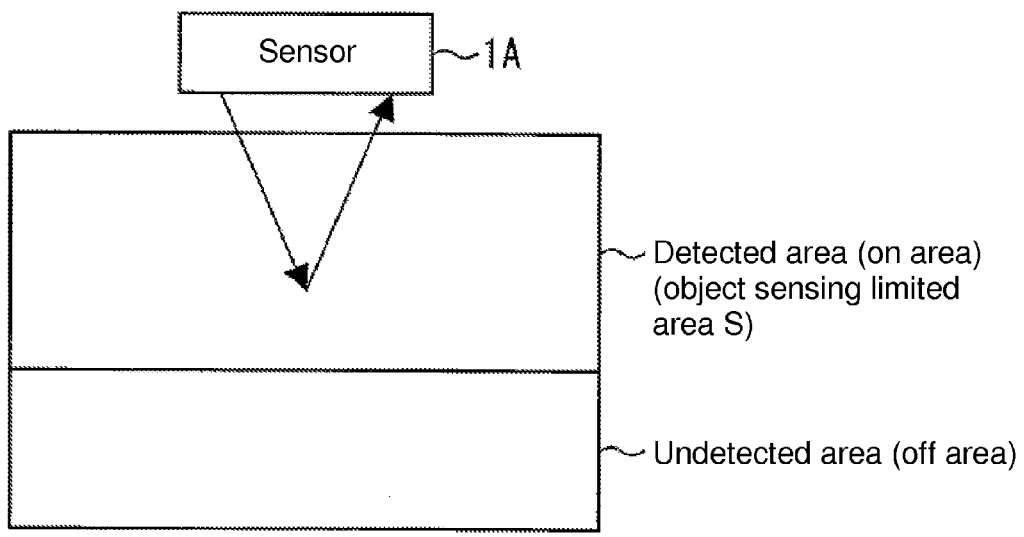
FIG. 2A is a view illustrating the object sensing limited area when the limited-area reflection type optical sensor of senses the object.
Figure 2B:
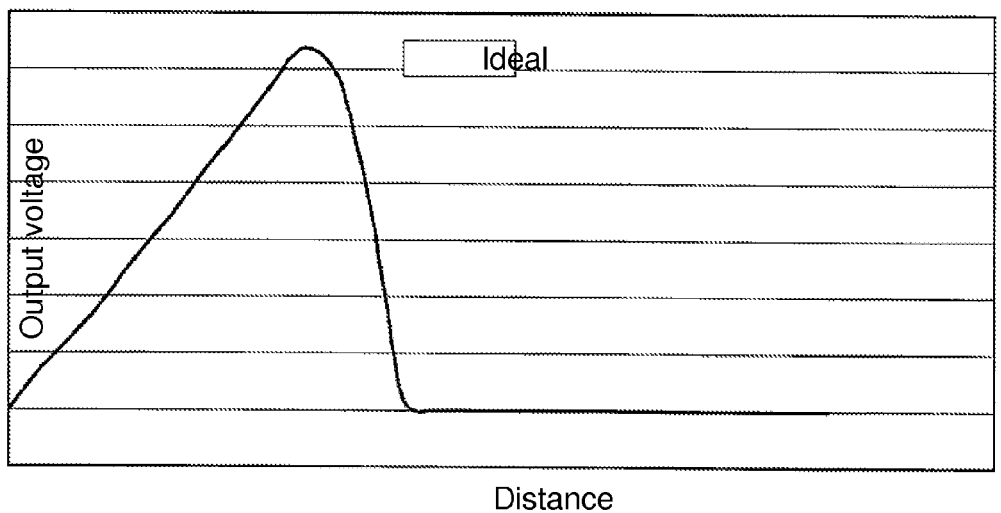
FIG. 2B is a waveform chart illustrating a detection signal in the object sensing limited area.

For example, a limited-area reflection type optical sensor 1A according to an embodiment may be applied to electronic devices such as mobile robots including a robot cleaner, a robotic wheelchair, and a security watching robot or other devices. Specifically, as illustrated in FIG. 2A, the limited-area reflection type optical sensor 1A may be used to detect whether an object exists within a limited range such that a step of the object is sensed, or such that the existence or non-existence of a sheet is detected. Accordingly, the object may be detected within a range of the designated object sensing limited area S even if light is specularly or diffusely reflected from the detection object. For example, in the case that the step is sensed for the purpose of the robot cleaner, as illustrated in FIG. 2B, desirably an output boundary is clearly defined on a far distance side while a detection range is obtained as widely as possible.

In the limited-area reflection type optical sensor 1A, the reflected light is a single light beam.

An advantage of the limited-area reflection type optical sensor 1A is that it is configured to enlarge the object sensing limited area S as much as possible.

Figure 3:
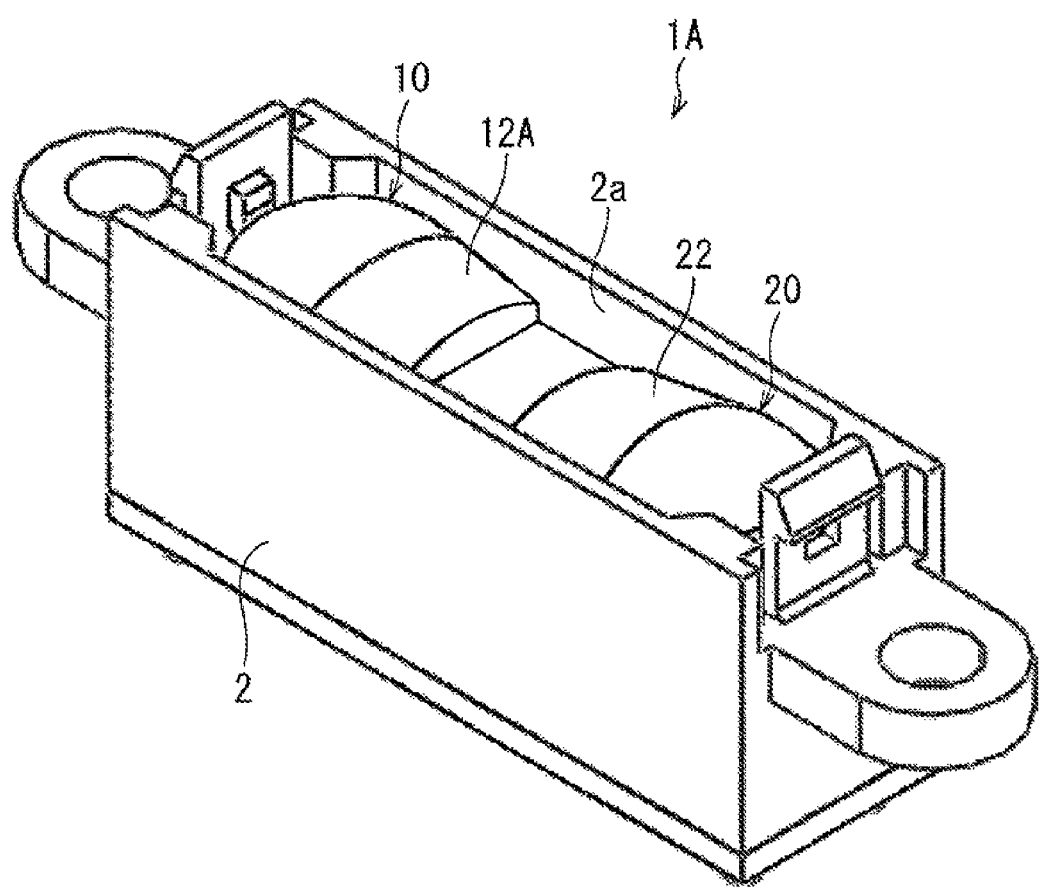
FIG. 3 is a perspective view illustrating a configuration of the limited-area reflection type optical sensor.
Figure 4A:
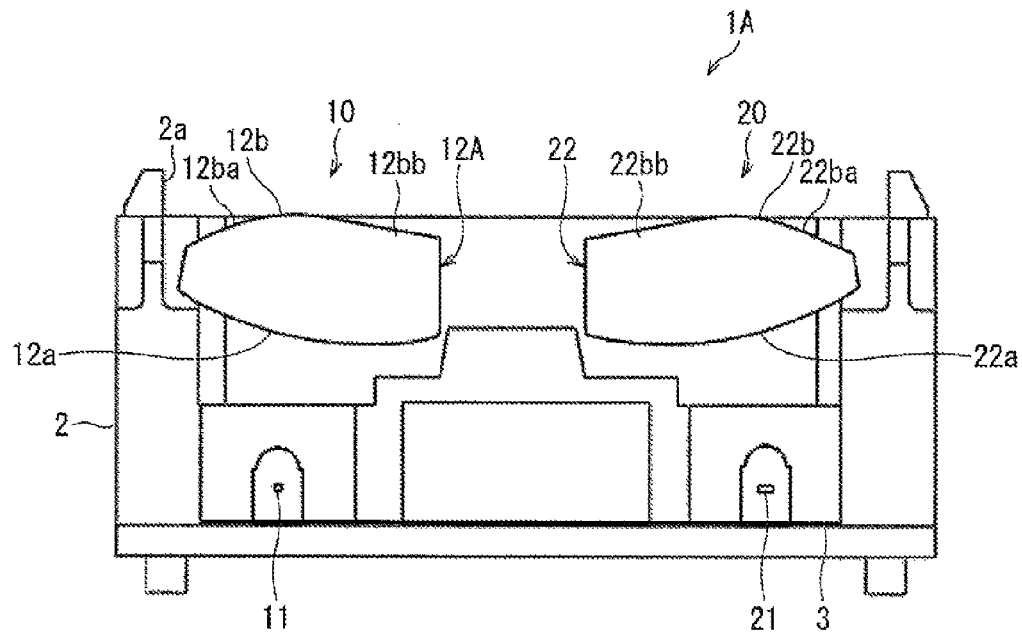
FIG. 4A is a sectional view illustrating the configuration of the limited-area reflection type optical sensor.
Figure 4B:
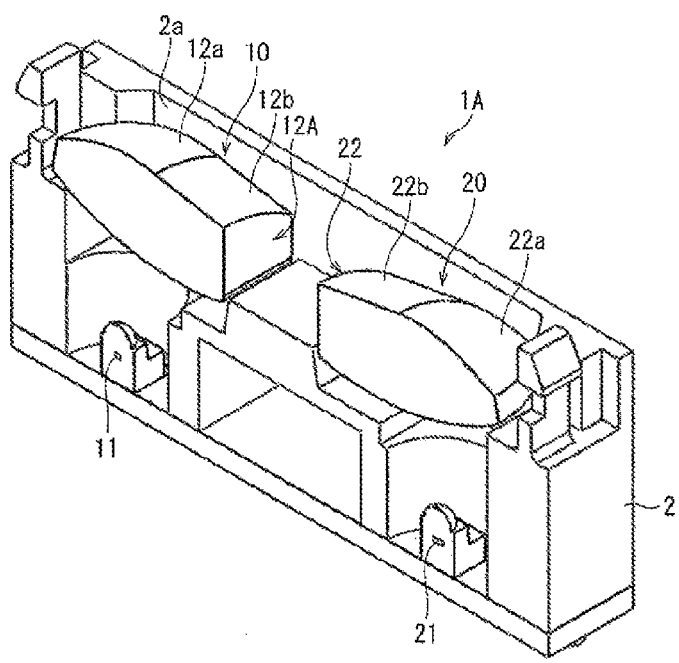
FIG. 4B is a perspective view illustrating a vertical section of the limited-area reflection type optical sensor.
Figure 5:
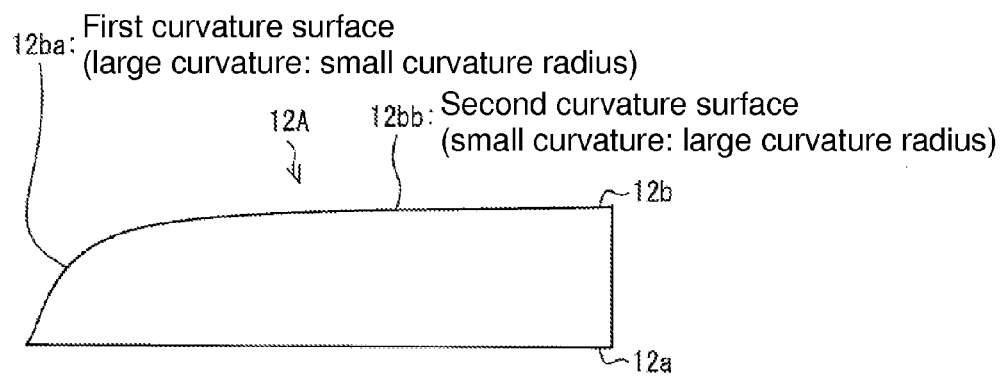
FIG. 5 is a sectional view illustrating a configuration of an emitted light lens provided in a light emitter of the limited-area reflection type optical sensor.
Figure 6:
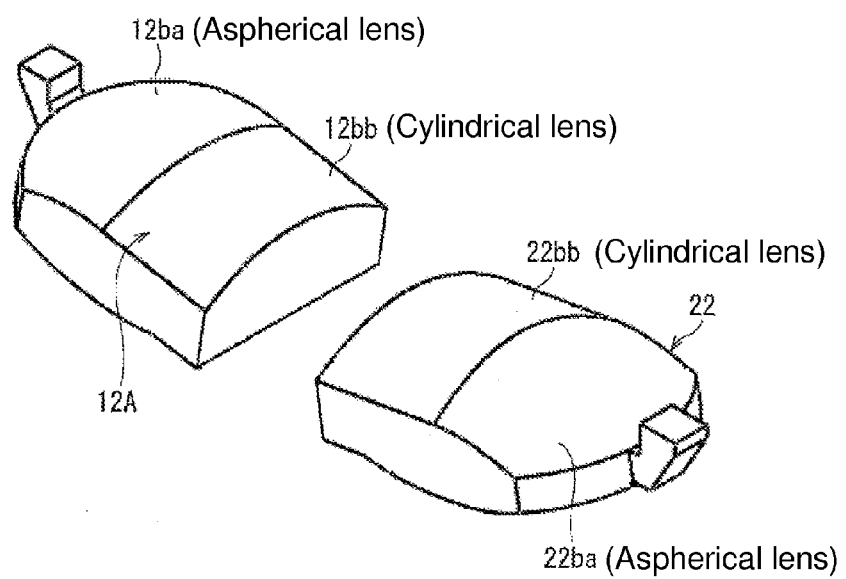
FIG. 6 is a perspective view illustrating the configuration of the emitted light lens provided in the light emitter and a configuration of a reflected light lens provided in a light receiver of the limited-area reflection type optical sensor.
Figures 7A, 7B:
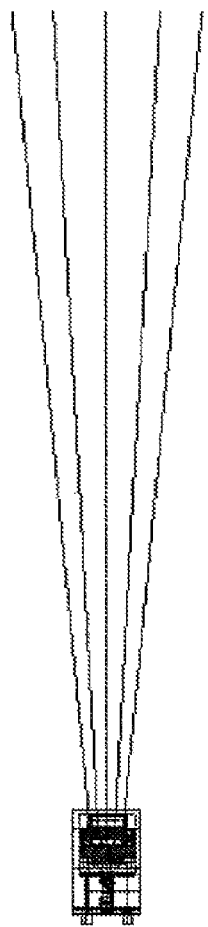
FIG. 7A is a view illustrating an optical path on a side having a curvature in a cylindrical lens used in a second curvature surface of the emitted light lens and a fifth curvature surface of the reflected light lens.
FIG. 7B is a view illustrating an optical path on a side not having the curvature in the cylindrical lens.
Figure 8A:
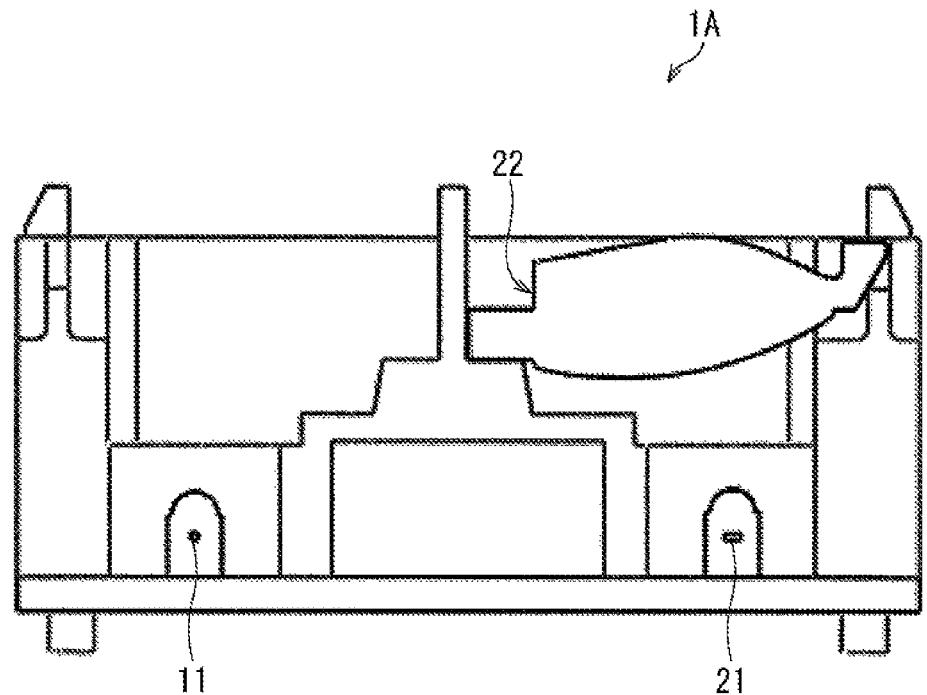
FIG. 8A is a sectional view illustrating the configuration of a modification of the limited-area reflection type optical sensor.
Figure 8B:
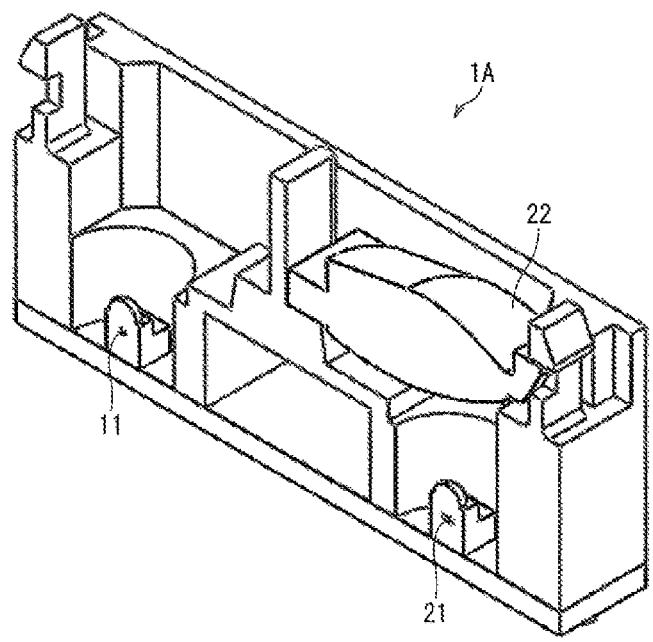
FIG. 8B is a perspective view illustrating a vertical section of the modification of the limited-area reflection type optical sensor.

A configuration of a limited-area reflection type optical sensor 1A will be described with reference to FIGS. 3 to 8. FIG. 3 is a perspective view illustrating the configuration of the limited-area reflection type optical sensor 1A. FIG. 4A is a sectional view illustrating the configuration of the limited-area reflection type optical sensor 1A, and FIG. 4B is a perspective view illustrating a vertical section of the limited-area reflection type optical sensor 1A. FIG. 5 is a sectional view illustrating a configuration of an emitted light lens 12A. FIG. 6 is a perspective view illustrating configurations of an emitted light lens 12A and a reflected light lens 22. FIG. 7A is a view illustrating an optical path on a side having a curvature in a cylindrical lens, and FIG. 7B is a view illustrating an optical path on a side not having the curvature in the cylindrical lens. FIG. 8A is a sectional view illustrating a configuration of a modification of the limited-area reflection type optical sensor 1A, and FIG. 8B is a perspective view illustrating a vertical section of the modification of the limited-area reflection type optical sensor 1A.

As illustrated in FIG. 3, the limited-area reflection type optical sensor 1A includes a light emitter 10 and a light receiver 20, and the light emitter 10 and the light receiver 20 are accommodated in a case 2.

As illustrated in FIGS. 4A and 4B, the light emitter 10 includes an LED (Light Emitting Diode) 11 as the light emitting element and an emitted light lens 12A that is provided in a front surface of the LED 11.

The light receiver 20 includes a phototransistor 21 as the light receiving element and a reflected light lens 22 that is provided in a front surface of the phototransistor 21. The optical sensor 1A may include at least one of the emitted light lens 12A and the reflected light lens 22 as illustrated in FIGS. 8A and 8B.

In an embodiment, the LED 11 may be used as the light emitting element and the phototransistor 21 may be used as the light receiving element. Alternatively, a laser diode may be used as the light emitting element and a photodiode may be used as the light receiving element. Alternatively, other kinds of light emitting elements except the LED and the laser diode and other kinds of light receiving elements except the phototransistor and the photodiode may be combined.

In the case 2, front surfaces of the emitted light lens 12A and the reflected light lens 22 constitute a case opening 2a such that the emitted light and the reflected light can pass through the case 2.

In the light emitter 10 and the light receiver 20, an intersection angle between optical axes of the emitted light and the reflected light is set such that the object sensing limited area S is irradiated with the light emitted from the light emitter 10, and such that the light receiver 20 can receive the light reflected from the object existing in the object sensing limited area S. The limited-area reflection type optical sensor 1A determines whether the object exists based on a light receiving level at the phototransistor 21, namely, a detection voltage. The determination whether the object exists is made by a determination unit on a printed board 3 that is of the determination section on which the LED 11 and the phototransistor 21 are mounted.

In the limited-area reflection type optical sensor 1A, the emitted light lens 12A that refracts the emitted light is provided in an optical path of the emitted light from the LED 11 to the object sensing limited area S.

As illustrated in FIGS. 4A, 4B, and 5, the emitted light lens 12A is one that has at least two different curvatures. Specifically, an opposite-light-emitter-side surface 12b opposite to a light-emitter-side surface 12a of emitted light lens 12A constitutes a first curvature surface 12ba in which an opposite-light-receiver-side portion opposite to a light receiver side has a first curvature, and a light-receiver-side portion on the light receiver side with respect to the opposite-light-receiver-side portion constitutes a second curvature surface 12bb having a second curvature smaller than the first curvature of the first curvature surface 12ba. The first curvature of the first curvature surface 12ba may be at least double the second curvature of the second curvature surface 12bb.

The emitted light lens 12A includes the first curvature surface 12ba and the second curvature surface 12bb in which the curvatures differ from each other. Alternatively, the emitted light lens may have at least three kinds of curvatures different from one another.

As illustrated in FIG. 6, for example, the first curvature surface 12ba is constructed with an aspherical lens, while the second curvature surface 12bb is constructed with a cylindrical lens. The cylindrical lens has a shape in which a column is divided into two in an axial direction, or an axis of the cylindrical lens. FIG. 7B is a view illustrating an optical path of the emitted light through a side of the cylindrical lens without a curvature. Therefore, as illustrated in FIG. 7B, because there is no curvature provided in the optical path of the emitted light, the light passes directly through the side without the curvature in the same manner that the light passes through a plane parallel glass plate. On the other hand, FIG. 7A illustrates an optical path of the emitted light through a side having a curvature in a cylindrical lens used in a second curvature surface of the emitted light lens and a fifth curvature surface of the reflected light lens. As illustrated in FIG. 7A, because a semi-circular section of a second direction has the curvature, the light is bent to prevent diffusion of the light, and a light quantity can be increased in the object sensing limited area S.

In an embodiment, the first curvature surface 12ba constructed with the aspherical lens has the first curvature at a vertex of an aspherical lens surface, and the second curvature surface 12bb constructed with the cylindrical lens has a second curvature at a vertex of a cylindrical lens surface. That is, in the invention, the first curvature is larger than the second curvature under the definition that the vertex of the first curvature surface 12ba has the first curvature while the vertex of the second curvature surface 12bb has the second curvature.

In an embodiment, the emitted light lens 12A is formed by integrating the aspherical lens including the first curvature surface 12ba with the cylindrical lens including the second curvature surface 12bb. Alternatively, the first curvature surface 12ba and the second curvature surface 12bb may separately be formed.

In the limited-area reflection type optical sensor 1A, the reflected light lens 22 that refracts the reflected light is provided in the optical path of the reflected light from the object sensing limited area S to the phototransistor 21.

The reflected light lens 22 has at least two different curvatures. Specifically, an opposite-light-receiver-side surface 22b opposite to a light-receiver-side surface 22a of the reflected light lens 22 constitutes a fourth curvature surface 22ba in which an opposite-light-emitter-side portion opposite to a light emitter side has a fourth curvature, and a light-emitter-side portion on the light emitter side with respect to the opposite-light-emitter-side portion constitutes a fifth curvature surface 22bb having a fifth curvature smaller than the fourth curvature of the fourth curvature surface 22ba. The reflected light lens 22 includes the fourth curvature surface 22ba and the fifth curvature surface 22bb in which the curvatures differ from each other. Alternatively, the reflected light lens may have at least three kinds of curvatures different from one another.

As illustrated in FIG. 6, for example, the fourth curvature surface 22ba is constructed with the aspherical lens, while the fifth curvature surface 22bb is constructed with the cylindrical lens.

In an embodiment, the fourth curvature surface 22ba constructed with the aspherical lens has the fourth curvature at the vertex of the aspherical lens surface, and the fifth curvature surface 22bb constructed with the cylindrical lens has the fifth curvature at the vertex of the cylindrical lens surface. That is, in the invention, the fourth curvature is larger than the fifth curvature under the definition that the vertex of the fourth curvature surface 22ba has the fourth curvature while the vertex of the fifth curvature surface 22bb has the fifth curvature.

In an embodiment, the reflected light lens 22 is formed by integrating the aspherical lens including the fourth curvature surface 22ba with the cylindrical lens including the fifth curvature surface 22bb. Alternatively, the fourth curvature surface 22ba and the fifth curvature surface 22bb may separately be formed.

Both the emitted light lens 12A and the reflected light lens 22 are provided in the limited-area reflection type optical sensor 1A. Alternatively, at least one of the emitted light lens 12A and the reflected light lens 22 may be provided as illustrated in FIGS. 8A and 8B.

In the limited-area reflection type optical sensor 1A, at least one of the emitted light lens 12A and the reflected light lens 22 may be exchanged.

Figure 1:
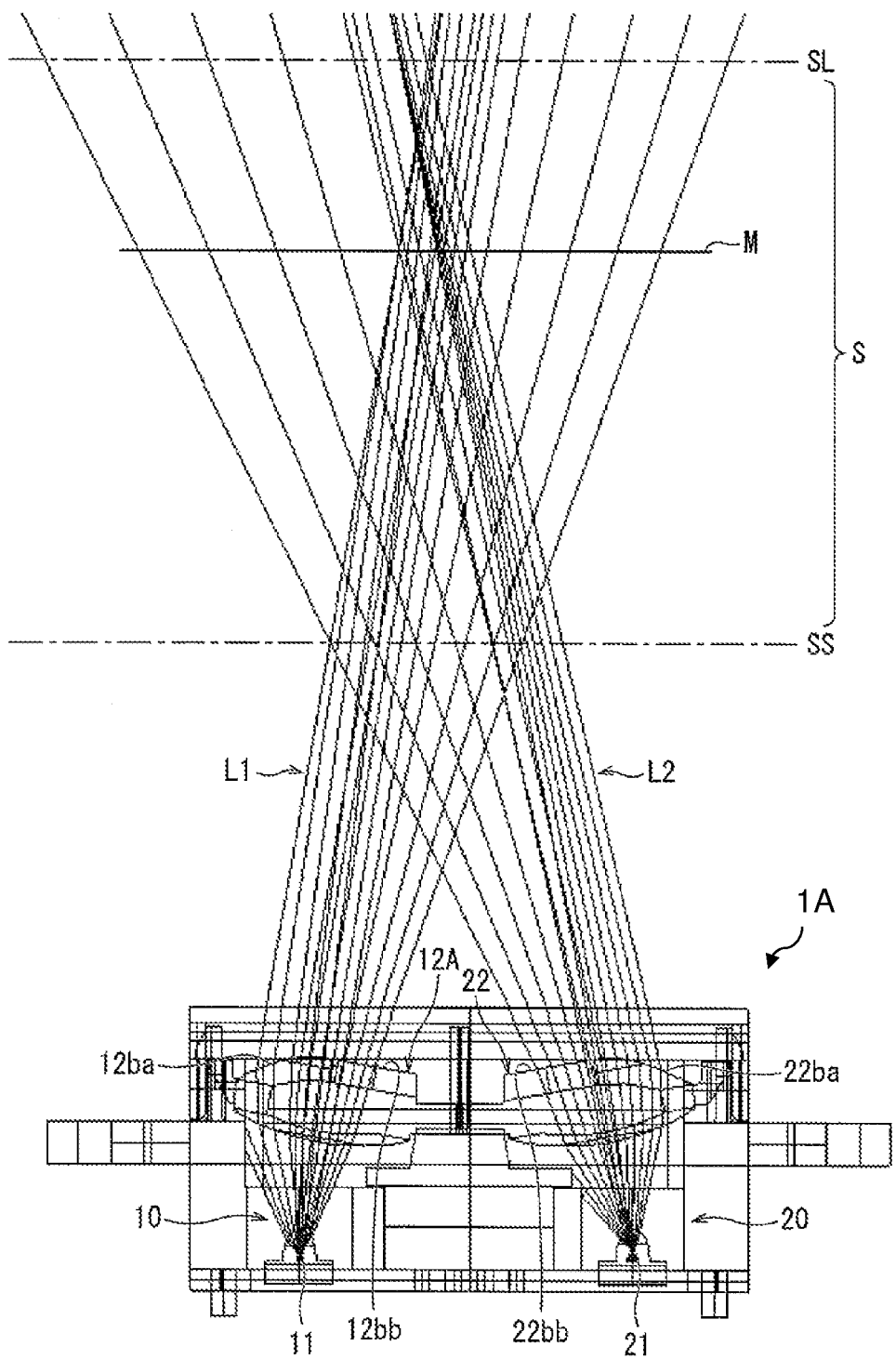
FIG. 1 is a sectional view illustrating a limited-area reflection type optical sensor according to an embodiment and a sensing state of an object in an object sensing limited area of the limited-area reflection type optical sensor.
Figure 9:
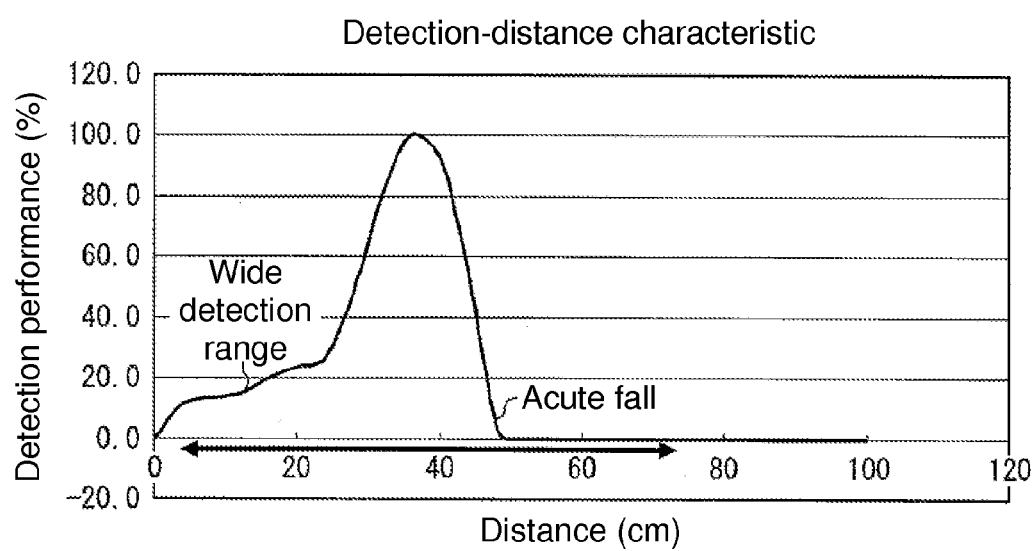
FIG. 9 is a graph illustrating a relationship between an object detection distance and detection performance in a phototransistor provided in the light receiver of the limited-area reflection type optical sensor.

An object detection method for determining whether the object exists in the limited-area reflection type optical sensor 1A having the above configuration will be described with reference to FIGS. 4A, 4B, 5, 6, 1, and 9. FIG. 1 is a sectional view illustrating an optical path of emitted light L1 and an optical path of reflected light L2 in the limited-area reflection type optical sensor 1A and a detection state of an object M in the object sensing limited area S. FIG. 9 is a graph illustrating a relationship between a detection distance and detection performance of the object M in the phototransistor 21.

In the limited-area reflection type optical sensor 1A, as illustrated in FIGS. 4A, 4B, 5, and 6, the emitted light lens 12A is provided in the optical path of the light emitted from the LED 11 of the light emitter 10. The emitted light lens 12A includes the first curvature surface 12ba having the large curvature on the opposite-light-receiver side and the second curvature surface 12bb having the small curvature on the light receiver side. Accordingly, as illustrated in FIG. 1, in the case that the emitted light L1 emitted from the LED 11 passes through the first curvature surface 12ba on the opposite-light-receiver side in the emitted light lens 12A, the emitted light L1 has a high light flux density to reach a far distance side of the object sensing limited area S. On the other hand, in the case that the emitted light L1 passes through the second curvature surface 12bb on the light-receiver side in the emitted light lens 12A, the emitted light L1 has a low light flux density to reach a near distance side of the object sensing limited area S.

As illustrated in FIGS. 4A, 4B, 5, and 6, the reflected light lens 22 is provided in the optical path of the reflected light from the object sensing limited area S toward the phototransistor 21 of the light receiver 20. The reflected light lens 22 includes the fourth curvature surface 22ba having the large curvature on the opposite-light-emitter side and the fifth curvature surface 22bb having the small curvature on the light emitter side. Accordingly, as illustrated in FIG. 1, the reflected light L2 from the far distance side of the object sensing limited area S passes through the fourth curvature surface 22ba on the opposite-light-emitter side of the reflected light lens 22 with the high light flux density. On the other hand, the reflected light L2 from the near distance side of the object sensing limited area S passes through the fifth curvature surface 22bb on the light emitter side of the emitted light lens 12A with the low light flux density.

As a result, in either the case that the object M exists on a far distance side SL of the object sensing limited area S or the case that the object M exists on a near distance side SS of the object sensing limited area S, the phototransistor 21 can detect the reflected light L2 reflected from the object M.

Specifically, as described above, the emitted light lens 12A is provided in the optical path of the light emitted from the LED 11 of the light emitter 10 as illustrated in FIG. 1. The emitted light lens 12A includes the first curvature surface 12ba having the large curvature on the opposite-light-receiver side and the second curvature surface 12bb having the small curvature on the light receiver side. The reflected light lens 22 is provided in the optical path of the reflected light from the object sensing limited area S toward the phototransistor 21 of the light receiver 20. The reflected light lens 22 includes the fourth curvature surface 22ba having the large curvature on the opposite-light-emitter side and the fifth curvature surface 22bb having the small curvature on the light receiver side. Accordingly, as illustrated in FIG. 9, because the reflected light L2 reflected from the object M on the far distance side SL has the high light flux density, there is an acute fall in the detection performance of the phototransistor 21 in receiving reflected light from the object M on the far distance side SL. In the case that a threshold whether the object M exists on the far distance side SL is set, a boundary between an on area and an off area of the far distance side SL in the phototransistor 21 is clarified or clearly defined to be able to determine whether the object M exist.

Thus, in the limited-area reflection type optical sensor 1A, the light emitter 10 emits the emitted light L1 toward the object sensing limited area S, and the light receiver 20 receives the reflected light L2 from the object M existing in the object sensing limited area S.

In the limited-area reflection type optical sensor 1A, the emitted light L1 and the reflected light L2 from the object M are the single light beams.

In an embodiment, the emitted light lens 12A is provided in the optical path of the emitted light L1. In the emitted light lens 12A, the opposite-light-receiver-side portion opposite to the light receiver side constitutes the first curvature surface 12ba having the first curvature, and the light-receiver-side portion on the light receiver side with respect to the opposite-light-receiver-side portion constitutes the second curvature surface 12bb having the second curvature smaller than the first curvature. This enables the object M to be detected on the far distance side SL in the object sensing limited area S using the emitted light passing through the first curvature surface 12ba having the large curvature in the opposite-light-receiver-side portion. At this point, because the emitted light L1 passing through the first curvature surface 12ba having the large curvature has the high light flux density, the quantity of light reflected from the object M can be increased, and the light receiver 20 receives the light quantity enough for the detection.

On the other hand, the object M can be detected on the near distance side SS in the object sensing limited area S using the emitted light L1 passing through the second curvature surface 12bb having the small curvature in the light-receiver-side portion. At this point, although the emitted light L1 passing through the second curvature surface 12bb having the small curvature has the low light flux density, the light receiver 20 receives the light quantity enough for the detection because of a short distance from the object M to the light receiver 20. The emitted light L1 passing through the second curvature surface 12bb having the small curvature has the low light flux density, so that the range can be spread in the direction of the near distance side SS. The configuration is simple because the emitted light lens 12A having the two curvatures different from each other is provided in order to spread the detection range.

Accordingly, the limited-area reflection type optical sensor can be provided. The limited-area reflection type optical sensor having the simple configuration can accurately detect the object, in which the distance to the surface to be measured changes, by spreading the detection range in a far-and-near direction, particularly on the near distance side.

The above function can also be achieved by a configuration in which the reflected light lens 22 is provided instead of the emitted light lens 12A. In the emitted light lens 12A provided in the optical path of the emitted light L1, the opposite-light-receiver-side portion opposite to the light receiver side constitutes the first curvature surface 12ba having the first curvature, and the light-receiver-side portion on the light receiver side with respect to the opposite-light-receiver-side portion constitutes the second curvature surface 12bb having the second curvature smaller than the first curvature. In the reflected light lens 22 provided in the optical path of the reflected light L2, the opposite-light-emitter-side portion opposite to the light emitter side constitutes the fourth curvature surface 22ba having the fourth curvature, and the light-emitter-side portion on the light emitter side with respect to the opposite-light-emitter-side portion constitutes the fifth curvature surface 22bb having the fifth curvature smaller than the fourth curvature.

Therefore, the light reflected from the object M on the far distance side SL in the object sensing limited area S is input to the light receiver 20 through the fourth curvature surface 22ba having the large curvature in the opposite-light-emitter-side portion of the reflected light lens 22. At this point, because the reflected light L2 passing through the fourth curvature surface 22ba having the large curvature has the high light flux density, the quantity of light reflected from the object M can be increased, and the light receiver 20 receives the light quantity enough for the detection.

On the other hand, the light reflected from the object on the near distance side in the object sensing limited area is input to the light receiver through the fifth curvature surface of the light-emitter-side having the small curvature in the reflected light lens. At this point, although the reflected light passing through the fifth curvature surface having the small curvature has the low light flux density, the light receiver receives the light quantity enough for the detection because of the short distance from the object to the light receiver.

This means that plural kinds of object sensing areas are generated in the direction opposed to the object M, and the detection range is spread in the far-and-near direction like the case that the emitted light lens 12A having the two curvatures different from each other is provided in the optical path of the emitted light L1. For the reflected light lens 22, the configuration is also simple because the reflected light lens 22 having the two curvatures different from each other is provided in order to spread the detection range.

The detection range in the far-and-near direction, particularly on the near distance side SS is spread by providing at least one of the emitted light lens 12A and the reflected light lens 22. In the emitted light lens 12A provided in the optical path of the emitted light L1, the opposite-light-receiver-side portion opposite to the light receiver side constitutes the first curvature surface 12ba having the first curvature, and the light-receiver-side portion on the light receiver side with respect to the opposite-light-receiver-side portion constitutes the second curvature surface 12bb having the second curvature smaller than the first curvature. In the reflected light lens 22 provided in the optical path of the reflected light L2, the opposite-light-emitter-side portion opposite to the light emitter side constitutes the fourth curvature surface 22ba having the fourth curvature, and the light-emitter-side portion on the light emitter side with respect to the opposite-light-emitter-side portion constitutes the fifth curvature surface 22bb having the fifth curvature smaller than the fourth curvature. Accordingly, the limited-area reflection type optical sensor 1A, which accurately detects the object M in which the distance to the surface to be measured changed, can be provided with the simple configuration.

In the limited-area reflection type optical sensor 1A, for example, the first curvature of the first curvature surface 12ba in the emitted light lens 12A is at least double the second curvature of the second curvature surface 12bb.

Therefore, the emitted light L1 passing through the first curvature surface 12ba has the dense light flux, and the object M on the far distance side SL in the object sensing limited area S can be detected compared with the emitted light L1 passing through the second curvature surface 12bb. A threshold for the detection is easy to set.

In the limited-area reflection type optical sensor 1A, for example, the fourth curvature of the fourth curvature surface 22ba in the reflected light lens 22 is at least double the fifth curvature of the fifth curvature surface 22bb. Therefore, the reflected light L2 passing through the fourth curvature surface 22ba has the dense light flux compared with the reflected light L2 passing through the fifth curvature surface 22bb, and the object M on the far distance side SL in the object sensing limited area S can be detected. A threshold for the detection is easy to set.

The determination unit on the printed board 3 that is of the determination section determining whether the object M exists in the object sensing limited area S based on the light receiving level at the light receiver 20 is provided in the limited-area reflection type optical sensor 1A. Therefore, the determination unit on the printed board 3 can determine whether the object M exists in the object sensing limited area S based on the light receiving level at the light receiver 20. The determination that the object does not exist in the object sensing limited area S is made when the light receiving level at the light receiver 20 is zero, and the determination that the object M exists in the object sensing limited area S is made when the light receiving level at the light receiver 20 is greater than or equal to a predetermined detection value.

At least one of the condition that at least one of the first curvature and the second curvature can be changed to a different curvature in the emitted light lens 12A and the condition that at least one of the fourth curvature and the fifth curvature can be changed to a different curvature in the reflected light lens 22 is satisfied in the limited-area reflection type optical sensor 1A.

Therefore, at least one of the emitted light lens 12A and the reflected light lens 22 can be exchanged to one having the different curvature. As a result, the object sensing limited area S may be changed easily.

At least one of the condition that the first curvature surface 12ba and the second curvature surface 12bb are integrally formed in the emitted light lens 12A and the condition that the fourth curvature surface 22ba and the fifth curvature surface 22bb are integrally formed in the reflected light lens 22 is satisfied in the limited-area reflection type optical sensor 1A.

Therefore, the number of components can be decreased. Position accuracy can be improved compared with the case that the two different curvatures are separated from each other, and a measure against stray light can be taken in the case that the two different curvatures are separated from each other. Additionally, the emitted light lens 12A or the reflected light lens 22 can separately be exchanged.

In the limited-area reflection type optical sensor 1A, the second curvature surface 12bb of the emitted light lens 12A constitutes a part of the cylindrical lens.

That is, the cylindrical lens is the semi-columnar lens. Therefore, although the light passes directly through the section having no curvature, the light is bent in a semicircular section having the curvature, and the diffusion of the light can be prevented to increase the light quantity in the object sensing limited area S.

In the emitted light lens 12A, the second curvature surface 12bb having the second curvature smaller than the first curvature may be produced in the light-receiver-side portion on the light receiver side with respect to the opposite-light-receiver-side portion.

In the case that the first curvature surface 12ba and the second curvature surface 12bb are separately formed, a commercially available cylindrical lens can be used as the second curvature surface 12bb having the second curvature smaller than the first curvature in the light-receiver-side portion on the light receiver side with respect to the opposite-light-receiver-side portion in the opposite-light-emitter-side surface 12b of the emitted light lens 12A. As a result, cost reduction can be achieved compared with the case that the second curvature surface 12bb of the emitted light lens 12 is separately produced.

In the limited-area reflection type optical sensor 1A, the fifth curvature surface 22bb of the reflected light lens 22 constitutes a part of the cylindrical lens.

That is, the cylindrical lens is the semi-columnar lens. Therefore, although the light passes directly through the section having no curvature, the light is bent in a semicircular section having the curvature, and the diffusion of the light can be prevented to increase the light quantity in the object sensing limited area S.

In the reflected light lens 22, the fifth curvature surface 22bb having the fifth curvature smaller than the fourth curvature may be produced in the light-emitter-side portion on the light emitter side with respect to the opposite-light-emitter-side portion.

In the case that the fourth curvature surface 22ba and the fifth curvature surface 22bb are separately formed, a commercially available cylindrical lens can be used as the fifth curvature surface 22bb having the fifth curvature smaller than the fourth curvature in the light-emitter-side portion on the light emitter side with respect to the opposite-light-emitter-side portion in the opposite-light-receiver-side surface 22b of the reflected light lens 22. As a result, the cost reduction can be achieved compared with the case that the fifth curvature surface 22bb of the reflected light lens 22 is separately produced.

In an embodiment, an electronic device may include the limited-area reflection type optical sensor 1A.

The limited-area reflection type optical sensor 1A having the simple configuration can accurately detect the object M, in which the distance to the surface to be measured changes, by increasing the detection range.

An embodiment will be described below with reference to FIGS. 10 to 12. Since the configuration is similar to the configurations in the embodiments described, components having the same function will be designated by the same numerals, and will not be described.

In the limited-area reflection type optical sensor 1A, the emitted light lens 12A and the reflected light lens 22 are separated from each other. A limited-area reflection type optical sensor 1B differs from the limited-area reflection type optical sensor 1A in that the limited-area reflection type optical sensor 1B includes an integrated emitted light/reflected light lens 30 to integrally form the emitted light lens 12A and the reflected light lens 22.

A configuration of the integrated emitted light/reflected light lens 30 in the limited-area reflection type optical sensor 1B will be described with reference to FIGS. 10 to 12. FIG. 10 is a perspective view illustrating the configuration of the limited-area reflection type optical sensor 1B. FIG. 11A is a sectional view illustrating the configuration of the limited-area reflection type optical sensor 1B, and FIG. 11B is a perspective view illustrating a vertical section of the limited-area reflection type optical sensor 1B. FIG. 12 is a perspective view illustrating a configuration of the integrated emitted light/reflected light lens 30 provided in the light emitter 10 and the light receiver 20 of the limited-area reflection type optical sensor 1B.

Figure 10:
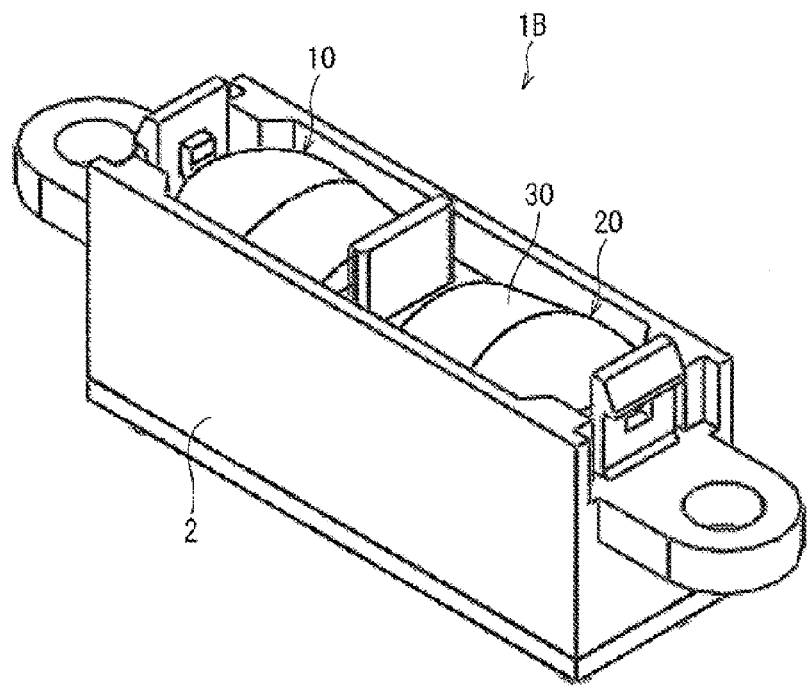
FIG. 10 is a perspective view illustrating a configuration of a limited-area reflection type optical sensor according to an embodiment.
Figure 11A:
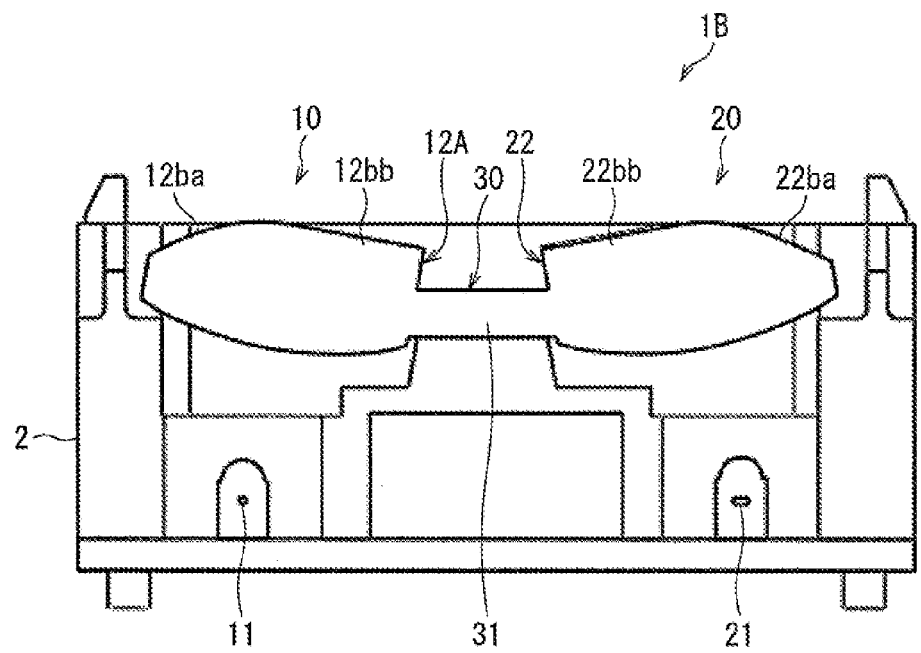
FIG. 11A is a sectional view illustrating the configuration of the limited-area reflection type optical sensor.
Figure 11B:
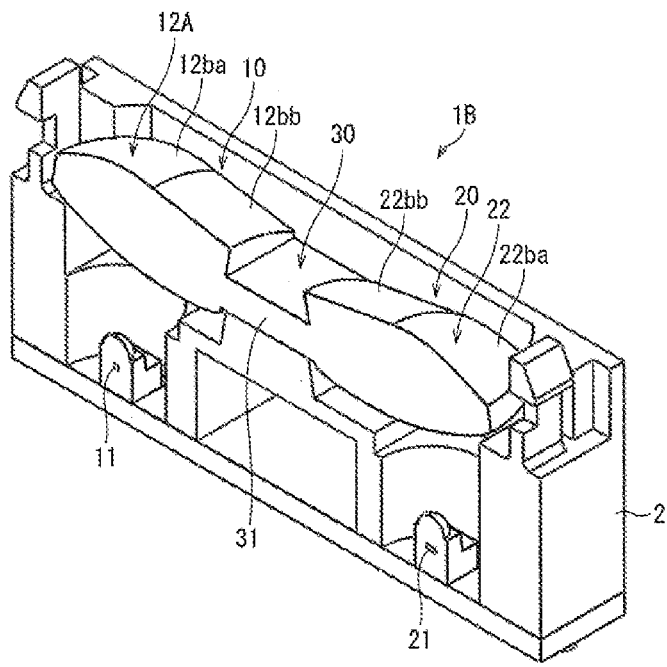
FIG. 11B is a perspective view illustrating a vertical section of the limited-area reflection type optical sensor.

As illustrated in FIG. 10, the limited-area reflection type optical sensor 1B includes the integrated emitted light/reflected light lens 30. In the integrated emitted light/reflected light lens 30, as illustrated in FIGS. 11A and 11B, a coupling unit 31 is provided between the emitted light lens 12A and the reflected light lens 22, and the emitted light lens 12A and the reflected light lens 22 are integrally coupled to each other by the coupling unit 31.

Figure 12:
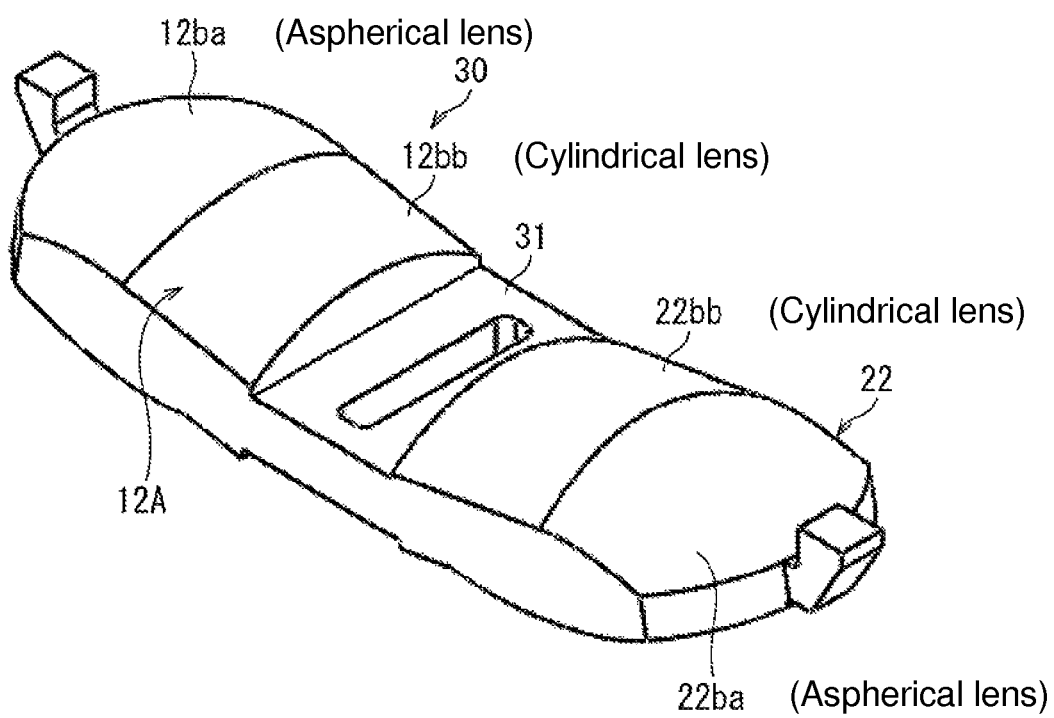
FIG. 12 is a perspective view illustrating a configuration of an integrated emitted light/reflected light lens provided in the light emitter and the light receiver of the limited-area reflection type optical sensor.

In the integrated emitted light/reflected light lens 30, as illustrated in FIG. 12, for example, the first curvature surface 12ba in the emitted light lens 12A is constructed with the aspherical lens similarly to the embodiment of FIG. 3. On the other hand, for example, the second curvature surface 12bb is constructed with the cylindrical lens. For example, the fourth curvature surface 22ba in the reflected light lens 22 is constructed with the aspherical lens. On the other hand, for example, the fifth curvature surface 22bb is constructed with the cylindrical lens.

Configurations which are identical to those of the light receiver 20 of the limited-area reflection type optical sensor 1A will not be described.

In the limited-area reflection type optical sensor 1B, the emitted light lens 12A and the reflected light lens 22 are constructed with the integrated emitted light/reflected light lens 30 in which the emitted light lens 12A and the reflected light lens 22 are integrally formed. Therefore, the number of components can further be decreased. The position accuracy can be improved compared with the case that the emitted light lens 12A and the reflected light lens 22 are separated from each other. Additionally, the integrated emitted light/reflected light lens 30 is easy to exchange.

An embodiment of the invention will be described below with reference to FIG. 13. Since the configuration is similar to the configurations in the embodiments described, components having the same function will be designated by the same numerals, and will not be described.

In the limited-area reflection type optical sensor 1A and the limited-area reflection type optical sensor 1B, the optical axis of the emitted light of the LED 11 is aligned with the center axis of the emitted light lens 12A. The light receiving axis of the phototransistor 21 is aligned with the center axis of the reflected light lens 22.

A limited-area reflection type optical sensor 10 differs from the limited-area reflection type optical sensors 1A and 1B in that the optical axis of the emitted light of the LED 11 is arranged on the opposite-light-receiver side with respect to the center axis of the emitted light lens 12A, and that the light receiving axis of the phototransistor 21 is arranged on the opposite-light-emitter side with respect to the center axis of the reflected light lens 22.

A configuration of the limited-area reflection type optical sensor 10 will be described with reference to FIG. 13. FIG. 13 is a front view illustrating the configuration of the limited-area reflection type optical sensor 1C.

Figure 13:
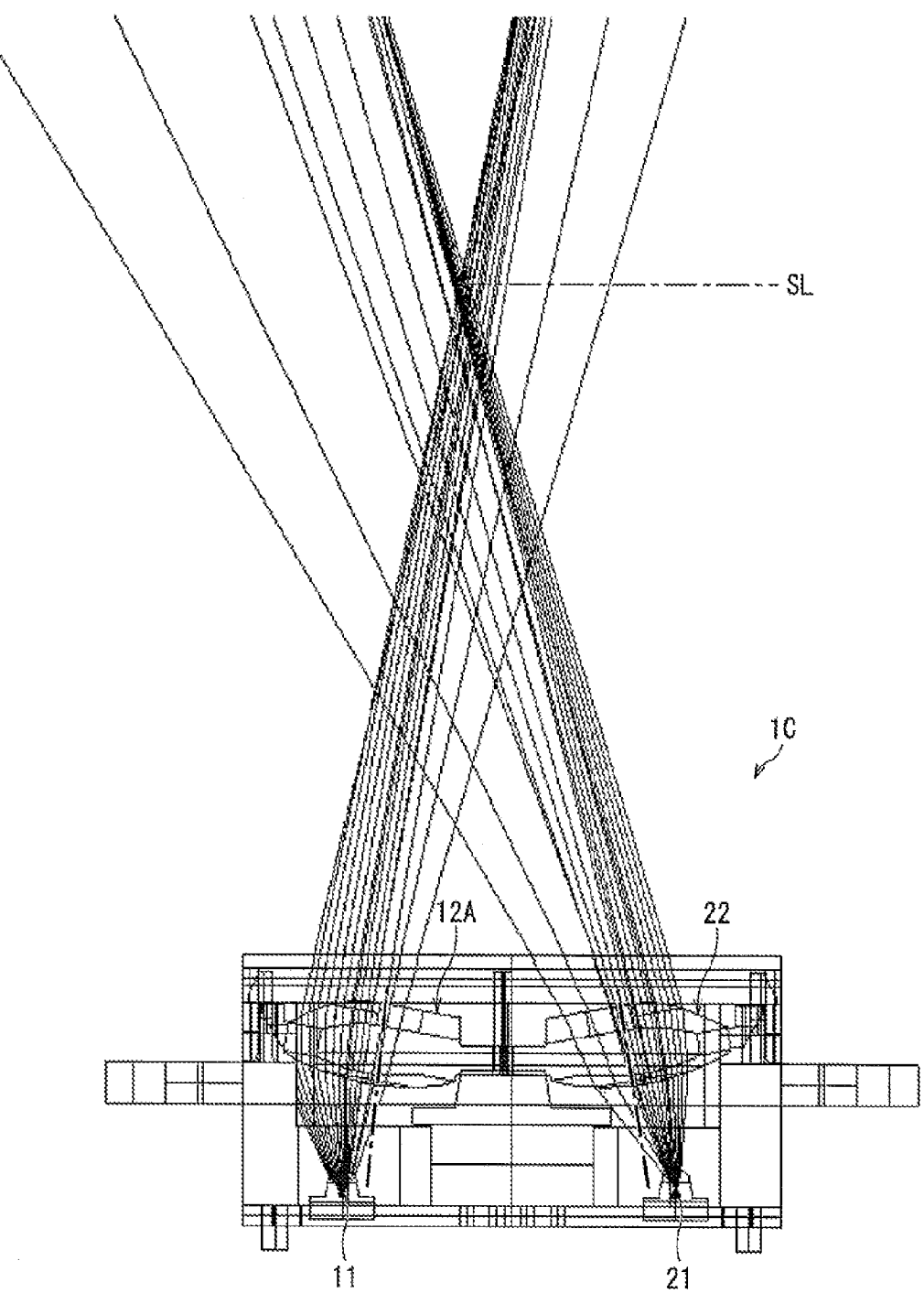
FIG. 13 is a front view illustrating a configuration of a limited-area reflection type optical sensor according to an embodiment.

In the limited-area reflection type optical sensor 10, as illustrated in FIG. 13, the light emitter 10 includes the LED 11 that is of the light emitting element emitting the emitted light L1, and the LED 11 is arranged such that the optical axis of the emitted light L1 emitted from the LED 11 is located on the opposite-light-receiver side with respect to the center axis of the emitted light lens 12A.

The light receiver 20 includes the phototransistor 21 that is of the light receiving element receiving the reflected light L2, and the phototransistor 21 is arranged such that the optical axis of the reflected light L2 in the phototransistor 21 is located on the opposite-light-emitter side with respect to the center axis of the reflected light lens 22.

Therefore, the spread of the light flux is eliminated on the far distance side, and only the portion having the high light flux density can be limited as the object sensing limited area S.

A embodiment of the invention will be described below with reference to FIG. 14. Since the configuration is similar to the configurations in the embodiments described, components having the same function will be designated by the same numerals, and will not be described.

Each of the limited-area reflection type optical sensor 1A, the limited-area reflection type optical sensor 1B, and the limited-area reflection type optical sensor 1C includes one phototransistor 21. On the other hand, a limited-area reflection type optical sensor 1D differs from the limited-area reflection type optical sensors 1A, 1B, and 10 in that the limited-area reflection type optical sensor 1D includes plural phototransistors 21.

A configuration of the limited-area reflection type optical sensor 1D will be described with reference to FIGS. 14A, 14B, and 14C. FIGS. 14A, 14B, and 14C are front views illustrating the light receiving states of plural phototransistors 21a, 21b, and 21c in the limited-area reflection type optical sensor 1D.

As illustrated in FIG. 14A, the limited-area reflection type optical sensor 1D includes three phototransistor 21a, 21b, and 21c that are of the light receiving element.

Therefore, as illustrated in FIG. 14A, the phototransistor 21a can receive the light on the near distance side SS nearest the limited-area reflection type optical sensor 1D in the object sensing limited area S. As illustrated in FIG. 14B, the phototransistor 21b can receive the light on an intermediate distance side SM located at an intermediate position from the limited-area reflection type optical sensor 1D in the object sensing limited area S. The phototransistor 21c can receive the light on the far distance side SL farthest from the limited-area reflection type optical sensor 1D in the object sensing limited area S.

As a result, the determination that the object M exists at the position on the near distance side SS nearest the limited-area reflection type optical sensor 1D in the object sensing limited area S can be made in the case that the phototransistor 21a senses the signal. The determination that the object M exists at the position on the intermediate distance side SM in the object sensing limited area S can be made in the case that the phototransistor 21b senses the signal. The determination that the object M exists at the position on the far distance side SL farthest from the limited-area reflection type optical sensor 1D in the object sensing limited area S can be made in the case that the phototransistor 21c senses the signal. Accordingly, the limited-area reflection type optical sensor 1D can be used as a displacement sensor that determines the position of the object M.

The invention may not limited to the embodiments described, but various changes can be made without departing from the scope of the invention.

For example, an object moving direction detection section may be provided in the limited-area reflection type optical sensor 1D. The object moving direction detection section determines whether the object M approaches or recedes by detecting the light receiving levels at the phototransistors 21a, 21b, and 21c that is of the light receiving element, namely, the change in detection voltage at the phototransistors 21a, 21b, and 21c.

Therefore, using the object moving direction detection section, whether the object approaches or recedes can be detected based on the change of the light receiving level at the phototransistors 21a, 21b, and 21c.

The limited-area reflection type optical sensor 1D may include a moving speed calculation section that calculates the approaching speed or the receding speed of the object M based on the light receiving levels of the phototransistors 21a, 21b, and 21c, namely, a time change in detection voltage.

Therefore, using the moving speed calculation section, the approaching speed or the receding speed of the object M can be calculated based on the time change of the light receiving level at the phototransistors 21a, 21b, and 21c.

An embodiment of the invention will be described below with reference to FIG. 15. Since the configuration is similar to the configurations in the embodiments described, components having the same function will be designated by the same numerals, and will not be described.

In the limited-area reflection type optical sensor 1A, the limited-area reflection type optical sensor 1B, the limited-area reflection type optical sensor 10, and the limited-area reflection type optical sensor 1D, the opposite-light-emitter-side surface 12b includes the first curvature surface 12ba having the first curvature with large curvature on the opposite-light-receiver side and the second curvature surface 12bb having the second curvature with small curvature on the light receiver side in the emitted light lens 12A and the integrated emitted light/reflected light lens 30, in which the two curvatures are different from each other.

On the other hand, a limited-area reflection type optical sensor 1E differs from the limited-area reflection type optical sensors 1A, 1B, 1C, and 1D in that the opposite-light-emitter-side surface 12b further includes a third curvature surface having a third curvature larger than the second curvature on the light receiver side with respect to the second curvature surface 12bb having the second curvature.

Figure 15A:
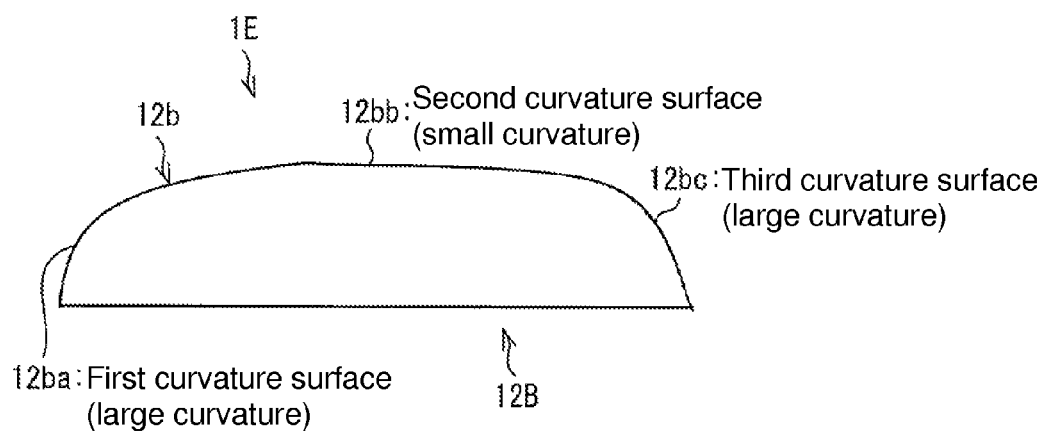
FIG. 15A is a sectional view illustrating a configuration of an emitted light lens included in a limited-area reflection type optical sensor according to an embodiment.
Figure 15B:
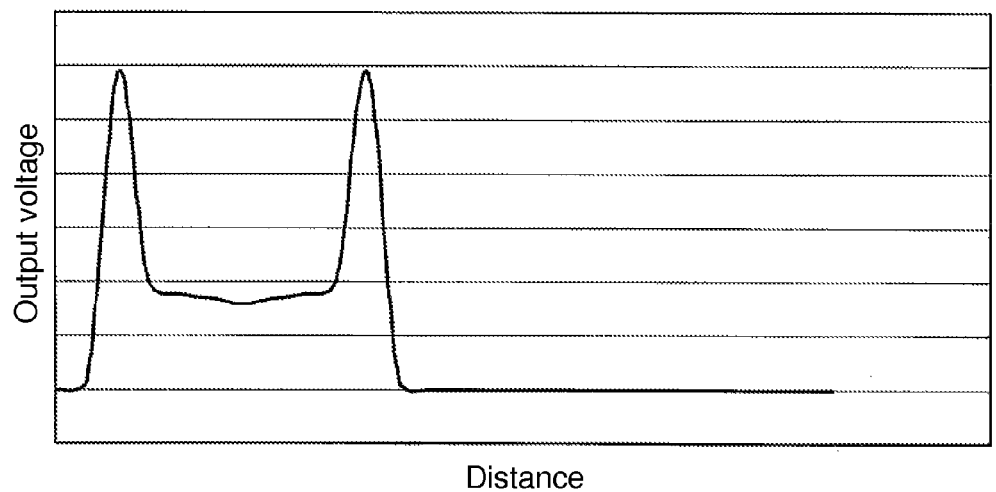
FIG. 15B is a waveform chart illustrating the detection signal in an object sensing limited area.
Figure 16A:
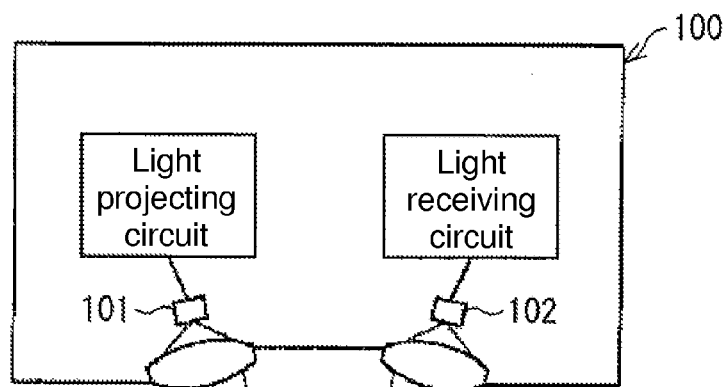
FIG. 16A is a schematic diagram illustrating a configuration of a conventional limited-area reflection type optical sensor.
Figure 16B:
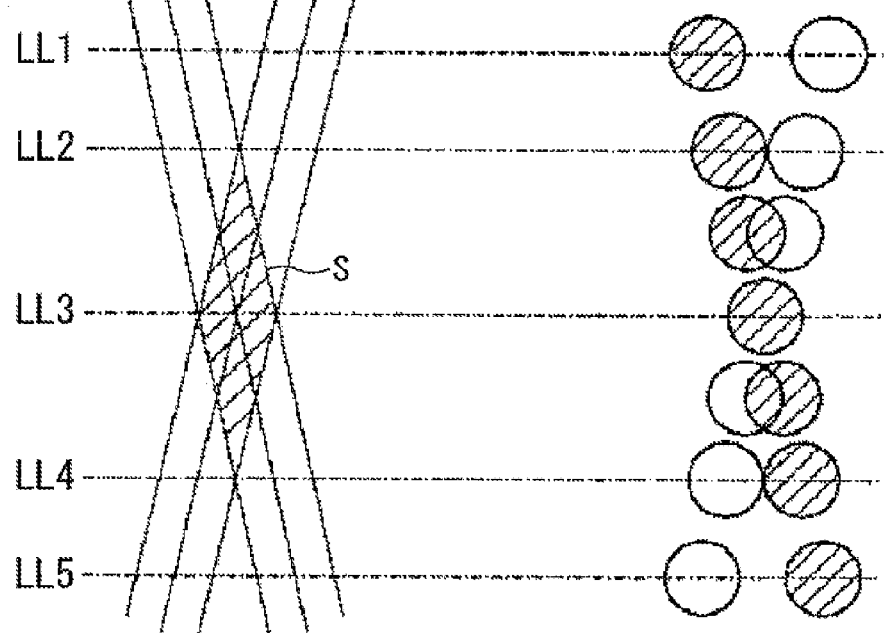
FIG. 16B is a plan view illustrating a relationship between emitted light and reflected light at a position of each distance from the limited-area reflection type optical sensor.
Figure 17:
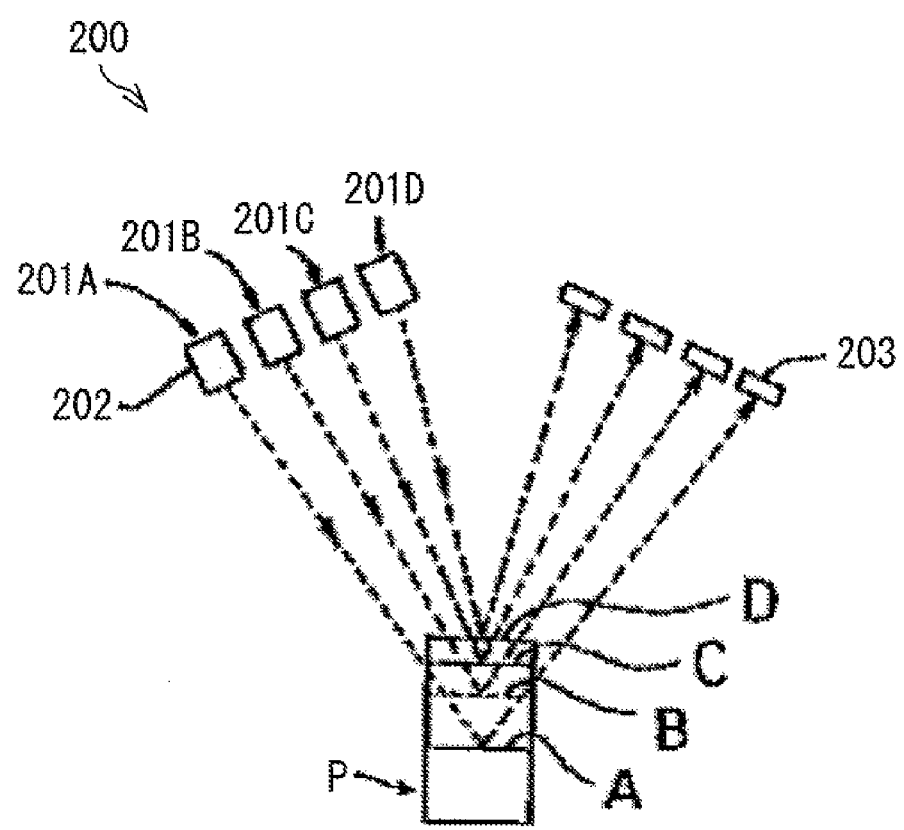
FIG. 17 is a schematic diagram illustrating a configuration of another conventional reflection type optical sensor.

A configuration of the limited-area reflection type optical sensor 1E will be described with reference to FIGS. 15A and 15B. FIG. 15A is a sectional view illustrating the configuration of an emitted light lens 12B in the limited-area reflection type optical sensor 1E, and FIG. 15B is a waveform chart illustrating the detection signal in the object sensing limited area S.

In the limited-area reflection type optical sensor 1E, as illustrated in FIG. 15A, in addition to the configuration of the emitted light lens 12A, the light receiver side with respect to the second curvature surface 12bb constitutes a third curvature surface 12bc having the third curvature larger than the second curvature of the second curvature surface 12bb in the opposite-light-emitter-side surface 12b of the emitted light lens 12B. For example, the third curvature of the third curvature surface 12bc is at least double the second curvature of the second curvature surface 12bb.

In the opposite-light-emitter-side surface 12b of the emitted light lens 12B, the first curvature surface 12ba is identical to the first curvature surface 12ba of the emitted light lens 12A of FIGS. 3, 10, and 13.

Referring to the embodiment as illustrated in FIG. 3, in the opposite-light-emitter-side surface 12b of the emitted light lens 12B, the opposite-light-receiver-side portion constitutes the first curvature surface 12ba having the large curvature, the light flux density of the emitted light L1 on the most opposite-light-receiver side increases in the emitted light L1 passing through the emitted light lens 12B, which allows an acute light intensity distribution of the emitted light L1 to be formed on the most opposite-light-receiver side. As a result, as illustrated in FIG. 15B, when the object is detected on the far distance side in the object sensing limited area S, the threshold may be set in order to determine whether the object M exists.

On the other hand, referring to FIG. 15A, the light receiver side (the right side in FIG. 15A) from the second curvature surface 12bb constitutes the third curvature surface 12bc having the third curvature larger than the second curvature of the second curvature surface 12bb in the opposite-light-emitter-side surface 12b of the emitted light lens 12B. That is, in the opposite-light-emitter-side surface 12b of the emitted light lens 12B, the most light-receiverside portion constitutes the third curvature surface 12*bc* having the third curvature larger than the second curvature of the second curvature surface 12*bb*, which allows the acute light intensity distribution of the emitted light L1 to be formed on the most light receiver side. As a result, as illustrated in FIG. 15B, when the object is detected on the near distance side in the object sensing limited area S, the threshold may be set in order to determine whether the object M exists.

Accordingly, the threshold may be set in order to determine whether the object M exists with respect to both the far distance side SL and the near distance side SS in the object sensing limited area S.

The embodiment is described for the emitted light lens 12B. Alternatively, the reflected light lens 22 may have the similar configuration.

That is, in the limited-area reflection type optical sensor 1E, the light emitter side with respect to the fifth curvature surface 22*bb* constitutes a sixth curvature surface having a sixth curvature larger than the fifth curvature of the fifth curvature surface 22*bb* in the opposite-light-receiver-side surface 22*b* of the reflected light lens 22.

At this point, for example, the sixth curvature of the sixth curvature surface in the reflected light lens 22 is at least double the fifth curvature of the fifth curvature surface 22*bb*.

Similarly, the threshold may be set in order to determine whether the object exists with respect to both the far distance side SL and the near distance side SS in the object sensing limited area S.

The configuration including the third curvature surface 12*bc* and the sixth curvature can also be applied to the integrated emitted light/reflected light lens 30 of FIG. 10.

In an embodiment, the object on the far distance side in the object sensing limited area may be detected using the emitted light passing through the first curvature surface having the large curvature in the opposite-light-receiver-side portion. At this point, because the emitted light passing through the first curvature surface having the large curvature has the high light flux density, a quantity of light reflected from the object can be increased, and the light receiver receives the light quantity enough for the detection.

On the other hand, the object can be detected on the near distance side in the object sensing limited area using the emitted light passing through the second curvature surface having the small curvature in the light-receiver-side portion. At this point, although the emitted light passing through the second curvature surface having the small curvature has the low light flux density, the light receiver receives the light quantity enough for the detection because of a short distance from the object to the light receiver. The emitted light passing through the second curvature surface having the small curvature has the low light flux density, so that the range can be spread in the direction of the near distance side. The configuration is simple because the emitted light lens having the two curvatures different from each other is provided in order to spread the detection range.

Accordingly, the limited-area reflection type optical sensor can be provided. The limited-area reflection type optical sensor having the simple configuration can accurately detect the object, in which the distance to the surface to be measured changes, by spreading the detection range in a far-and-near direction, particularly on the near distance side.

The above function can also be achieved by a configuration in which the reflected light lens is provided instead of the emitted light lens. In the emitted light lens provided in the optical path of the emitted light, the opposite-light-receiver-side portion opposite to the light receiver side constitutes the first curvature surface having the first curvature, and the light-receiver-side portion on the light receiver side with respect to the opposite-light-receiver-side portion constitutes the second curvature surface having the second curvature smaller than the first curvature. In the reflected light lens provided in the optical path of the reflected light, the opposite-light-emitter-side portion opposite to the light emitter side constitutes the fourth curvature surface having the fourth curvature, and the light-emitter-side portion on the light emitter side with respect to the opposite-light-emitter-side portion constitutes the fifth curvature surface having the fifth curvature smaller than the fourth curvature.

Therefore, the light reflected from the object on the far distance side in the object sensing limited area is input to the light receiver through the fourth curvature surface having the large curvature in the opposite-light-emitter-side portion of the reflected light lens. At this point, because the emitted light passing through the fourth curvature surface having the large curvature has the high light flux density, the quantity of light reflected from the object can be increased, and the light receiver receives the light quantity enough for the detection.

On the other hand, the light reflected from the object on the near distance side in the object sensing limited area is input to the light receiver through the fifth curvature surface having the small curvature in the reflected light lens. At this point, although the reflected light passing through the fifth curvature surface having the small curvature has the low light flux density, the light receiver receives the light quantity enough for the detection because of the short distance from the object to the light receiver.

This means that plural kinds of object sensing areas are generated in the direction opposed to the object, and the detection range is spread in the far-and-near direction like the case that the emitted light lens having the two curvatures different from each other is provided in the optical path of the emitted light. For the reflected light lens, the configuration is also simple because the reflected light lens having the two curvatures different from each other is provided in order to spread the detection range.

The detection range in the far-and-near direction, particularly on the near distance side is spread by providing at least one of the emitted light lens and the reflected light lens. In the emitted light lens provided in the optical path of the emitted light, the opposite-light-receiver-side portion opposite to the light receiver side constitutes the first curvature surface having the first curvature, and the light-receiver-side portion on the light receiver side with respect to the opposite-light-receiver-side portion constitutes the second curvature surface having the second curvature smaller than the first curvature. In the reflected light lens provided in the optical path of the reflected light, the opposite-light-emitter-side portion opposite to the light emitter side constitutes the fourth curvature surface having the fourth curvature, and the light-emitter-side portion on the light emitter side with respect to the opposite-light-emitter-side portion constitutes the fifth curvature surface having the fifth curvature smaller than the fourth curvature. Accordingly, the limited-area reflection type optical sensor, which accurately detects the object in which the distance to the surface to be measured changed, can be provided with the simple configuration.

The limited-area reflection type optical sensor may include a determination section configured to determine whether the object exists in the object sensing limited area based on a light receiving level at the light receiver.

Therefore, the determination section can determine whether the object exists in the object sensing limited area based on the light receiving level at the light receiver. The determination that the object does not exist in the object sensing limited area is made when the light receiving level is zero at the light receiver, and the determination that the object exists in the object sensing limited area is made when the light receiving level is greater than or equal to a predetermined detection value at the light receiver.

In the limited-area reflection type optical sensor, preferably at least one of a condition that at least one of the first curvature and the second curvature can be changed to a different curvature in the emitted light lens and a condition that at least one of the fourth curvature and the fifth curvature can be changed to a different curvature in the reflected light lens is satisfied.

Therefore, at least one of the emitted light lens and the reflected light lens can be exchanged to one having the different curvature. As a result, the object sensing limited area may be changed easily.

In the limited-area reflection type optical sensor, preferably at least one of a condition that the first curvature surface and the second curvature surface are integrally formed in the emitted light lens and a condition that the fourth curvature surface and the fifth curvature surface are integrally formed in the reflected light lens is satisfied.

Therefore, the number of components can be decreased. Position accuracy can be improved compared with the case that the two different curvatures are separated from each other, and a measure against stray light can be taken in the case that the two different curvatures are separated from each other. Additionally, the emitted light lens or the reflected light lens can separately be exchanged.

In the limited-area reflection type optical sensor, preferably the emitted light lens and the reflected light lens are integrally formed.

Therefore, the number of components can further be decreased. The position accuracy can be improved compared with the case that the emitted light lens and the reflected light lens are separated from each other. The integrated lens is easy to exchange.

In the limited-area reflection type optical sensor, preferably the light emitter includes a light emitting element configured to emit the emitted light, the light emitting element is arranged such that an optical axis of the emitted light emitted from the light emitting element is located on the opposite-light-receiver side with respect to a center axis of the emitted light lens, the light receiver includes a light receiving element configured to receive the reflected light, and the light receiving element is arranged such that an optical axis of the reflected light in the light receiving element is located on the opposite-light-emitter side with respect to a center axis of the reflected light lens.

Therefore, the spread of the light flux is eliminated on the far distance side, and only the portion having the high light flux density can be limited as the object sensing limited area.

In the limited-area reflection type optical sensor, preferably plural light receiving elements configured to receive the reflected light reflected from the object from plural directions are provided in the light receiver.

Therefore, the limited-area reflection type optical sensor can be used as a displacement sensor that determines the position of the object.

In the limited-area reflection type optical sensor, preferably a third curvature surface having a third curvature larger than the second curvature of the second curvature surface is formed on the light receiver side with respect to the second curvature surface in the emitted light lens.

As described above, in the emitted light lens, the most opposite-light-receiver-side portion has a first curvature having the large curvature, the light flux density of the emitted light on the most opposite-light-receiver side increases in the emitted light passing through the emitted light lens, which allows an acute light intensity distribution of the emitted light to be formed on the most opposite-light-receiver side. As a result, when the object is detected on the far distance side in the object sensing limited area, a threshold may be set in order to determine whether the object exists.

In an embodiment, the third curvature surface having the third curvature larger than the second curvature of the second curvature surface is formed on the light receiver side with respect to the second curvature surface in the emitted light lens. That is, in the emitted light lens, the most light-receiver-side portion constitutes the third curvature surface having the third curvature larger than the second curvature, which allows an acute light intensity distribution of the emitted light to be formed on the most light receiver side. As a result, when the object is detected on the near distance side in the object sensing limited area, a threshold may be set in order to determine whether the object exists.

Accordingly, the threshold may be set in order to determine whether the object exists with respect to both the far distance side and the near distance side in the object sensing limited area.

In the limited-area reflection type optical sensor, preferably the second curvature surface of the emitted light lens constitutes a part of a cylindrical lens.

That is, the cylindrical lens is the semi-columnar lens. Therefore, although the light passes directly through the section having no curvature, the light is bent in a semi-circular section having the curvature, and diffusion of the light can be prevented to increase the light quantity in the object sensing limited area.

In the emitted light lens, the second curvature surface having the second curvature smaller than the first curvature may be produced in the light-receiver-side portion on the light receiver side with respect to the opposite-light-receiver-side portion. Additionally, a commercially available cylindrical lens can be used as the second curvature surface in the case that the first curvature surface and the second curvature surface are separately formed. As a result, cost reduction can be achieved compared with the case that the second curvature surface of the emitted light lens is separately produced.

In the limited-area reflection type optical sensor, preferably a sixth curvature surface having a sixth curvature larger than the fifth curvature of the fifth curvature surface is formed on the light emitter side with respect to the fifth curvature surface in the reflected light lens.

As described above, in the reflected light lens, the most opposite-light-emitter-side portion has a fourth curvature having the large curvature, the light flux density of the reflected light on the most opposite-light-emitter side increases in the reflected light passing through the fourth curvature surface of the reflected light lens, which allows the acute light intensity distribution of the reflected light to be formed on the most opposite-light-emitter side. As a result, when the object is detected on the far distance side in the object sensing limited area, a threshold may be set in order to determine whether the object exists.

In an embodiment, the sixth curvature surface having the sixth curvature larger than the fifth curvature of the fifth curvature surface is formed on the light emitter side with respect to the fifth curvature surface in the reflected light lens. That is, in the reflected light lens, the most light-emitter-side portion constitutes the sixth curvature surface having the sixth curvature larger than the fifth curvature, which allows the acute light intensity distribution of the reflected light to be formed on the most light emitter side. As a result, when the object is detected on the near distance side in the object sensing limited area, a threshold may be set in order to determine whether the object exists.

Accordingly, the threshold may be set in order to determine whether the object exists with respect to both the far distance side and the near distance side in the object sensing limited area.

In the limited-area reflection type optical sensor, preferably the fifth curvature surface of the reflected light lens constitutes a part of a cylindrical lens.

That is, the cylindrical lens is the semi-columnar lens. Therefore, although the light passes directly through the section having no curvature, the light is bent in a semicircular section having the curvature, and diffusion of the light can be prevented to increase the light quantity in the object sensing limited area.

In the reflected light lens, the fifth curvature surface having the fifth curvature smaller than the fourth curvature may be produced in the light-emitter-side portion on the light emitter side with respect to the opposite-light-emitter-side portion. Additionally, a commercially available cylindrical lens can be used as the fifth curvature surface in the case that the fourth curvature surface and the fifth curvature surface are separately formed. As a result, the cost reduction can be achieved compared with the case that the fifth curvature surface of the reflected light lens is separately produced.

A threshold used to determine whether the object exists can easily be set.

In an embodiment, an electronic device includes the above limited-area reflection type optical sensor.

Therefore, the electronic device including the limited-area reflection type optical sensor can be provided. The limited-area reflection type optical sensor having the simple configuration can accurately detect the object, in which the distance to the surface to be measured changes, by spreading the detection range.

Accordingly, the simple-configuration limited-area reflection type optical sensor that can accurately detect the object, in which the distance to the surface to be measured changes, by spreading the detection range and the electronic device can advantageously be provided.

The invention is not limited to each of the above-described embodiments, but various changes can be made within the scope of claims. The technical scope of the invention also includes an embodiment obtained by a proper combination of the technical sections disclosed in the different embodiments.

The invention can be applied to the limited-area reflection type optical sensor in which the object detection area is limited. Specifically, for example, the limited-area reflection type optical sensor can be applied to electronic devices of mobile robots such as a robot cleaner, a robotic wheelchair, and a security watching robot. Additionally, for example, the limited-area reflection type optical sensor can also be applied to a board sensing conveyer (board sensing), a food packing machine, an FPC production apparatus (transparent film sensing), and a general conveying apparatus.

The invention claimed is:

1. A limited-area reflection type optical sensor configured to irradiate an object sensing limited area with emitted light from a light emitter and receive reflected light from an object existing in the object sensing limited area, the optical sensor comprising:
    an emitted light lens or a reflected light lens;
    wherein the emitted light lens comprises:
    an opposite-light-receiver-side portion opposite to a light receiver side constituting a first curvature surface comprising a first curvature while a light-receiver-side portion on the light receiver side with respect to the opposite-light-receiver-side portion constitutes a second curvature surface comprising a second curvature smaller than the first curvature in the emitted light lens provided in an optical path of the emitted light;
    wherein the reflected light lens comprises:
    an opposite-light-emitter-side portion opposite to a light emitter side constituting a fourth curvature surface comprising a fourth curvature while a light-emitter-side portion on the light emitter side with respect to the opposite-light-emitter-side portion constitutes a fifth curvature surface comprising a fifth curvature smaller than the fourth curvature in the reflected light lens provided in an optical path of the reflected light
    wherein the light emitter comprises a light emitting element configured to emit the emit light, the light emitting element is arranged such that an optical axis of the emitted light emitted from the light emitting element is located on the opposite-light-receiver side with respect to a center axis of the emitted light lens,
    the light receiver comprises a light receiving element configured to receive the reflected light, and the light receiving element is arranged such that an optical axis of the reflected light in the light receiving element is located on the opposite-light-emitter side with respect to a center axis of the reflected light lens.

2. The limited-area reflection type optical sensor according to claim 1, comprising a determination section configured to determine whether the object exists in the object sensing limited area based on a light receiving level at the light receiver.

3. The limited-area reflection type optical sensor according to claim 1, further comprising at least one of:
    at least one of the first curvature and the second curvature is changeable to a different curvature in the emitted light lens; and
    at least one of the fourth curvature and the fifth curvature is changeable to a different curvature in the reflected light lens.

4. The limited-area reflection type optical sensor according to claim 1, further comprising at least one of:
    the first curvature surface and the second curvature surface are integrally formed in the emitted light lens; and
    the fourth curvature surface and the fifth curvature surface are integrally formed in the reflected light lens.

5. The limited-area reflection type optical sensor according to claim 1, wherein the emitted light lens and the reflected light lens are integrally formed.

6. The limited-area reflection type optical sensor according to claim 1, wherein a plurality of light receiving elements configured to receive the reflected light reflected from the object from a plurality of directions are provided in the light receiver.

7. The limited-area reflection type optical sensor according to claim 1, wherein a third curvature surface comprising a third curvature larger than the second curvature of the second curvature surface is formed on the light receiver side with respect to the second curvature surface in the emitted light lens.

8. The limited-area reflection type optical sensor according to claim 1, wherein the second curvature surface of the emitted light lens constitutes a part of a cylindrical lens.

9. The limited-area reflection type optical sensor according to claim 1, wherein a sixth curvature surface comprising a sixth curvature larger than the fifth curvature of the fifth curvature surface is formed on the light emitter side with respect to the fifth curvature surface in the reflected light lens.

10. The limited-area reflection type optical sensor according to claim 1, wherein the fifth curvature surface of the reflected light lens constitutes a part of a cylindrical lens.

11. An electronic device comprising a limited-area reflection type optical sensor configured to irradiate an object sensing limited area with emitted light from a light emitter and receive reflected light from an object in the object sensing limited area, the optical sensor comprising:
an emitted light lens or a reflected light lens;
wherein the emitted light lens comprises:
an opposite-light-receiver-side portion opposite to a light receiver side constituting a first curvature surface comprising a first curvature while
a light-receiver-side portion on the light receiver side with respect to the opposite-light-receiver-side portion constitutes a second curvature surface comprising a second curvature smaller than the first curvature in the emitted light lens provided in an optical path of the emitted light;
wherein the reflected light lens comprises:
an opposite-light-emitter-side portion opposite to a light emitter side constituting a fourth curvature surface comprising a fourth curvature while
a light-emitter-side portion on the light emitter side with respect to the opposite-light-emitter-side portion constitutes a fifth curvature surface comprising a fifth curvature smaller than the fourth curvature in the reflected light lens provided in an optical path of the reflected light
wherein the light emitter comprises a light emitting element configured to emit the emitted light, the light emitting element is arranged such that an optical axis of the emitted light emitted from the light emitting element is located on the opposite-light-receiver side with respect to a center axis of the emitted light lens,
the light receiver comprises a light receiving element configured to receive the reflected light, and the light receiving element is arranged such that an optical axis of the reflected light in the light receiving element is located on the opposite-light-emitter side with respect to a center axis of the reflected light lens.

12. An object detection method for determining whether an object exists in an object sensing limited area, the method comprising the steps of:
a) irradiating the object sensing limited area with emitted light from a light emitter;
b) receiving reflected light from the object existing in the object sensing limited area in a light receiver; and
c) performing at least one of:
providing an emitted light lens in an optical path of the emitted light from the light emitter; and
providing a reflected light lens in an optical path of the reflected light from the object sensing limited area to the light receiver;
wherein the emitted light lens comprises:
an opposite-light-receiver-side portion opposite to a light receiver side constituting a first curvature surface comprising a first curvature while
a light-receiver-side portion on the light receiver side with respect to the opposite-light-receiver-side portion constitutes a second curvature surface comprising a second curvature smaller than the first curvature in the emitted light lens provided in an optical path of the emitted light;
wherein the reflected light lens comprises:
an opposite-light-emitter-side portion opposite to a light emitter side constituting a fourth curvature surface comprising a fourth curvature while
a light-emitter-side portion on the light emitter side with respect to the opposite-light-emitter-side portion constitutes a fifth curvature surface comprising a fifth curvature smaller than the fourth curvature in the reflected light lens provided in an optical path of the reflected light,
wherein the light emitter comprises a light emitting element configured to emit the emitted light, the light emitting element is arranged such that an optical axis of the emitted light emitted from the light emitting element is located on the opposite-light-receiver side with respect to a center axis of the emitted light lens,
the light receiver comprises a light receiving element configured to receive the reflected light, and the light receiving element is arranged such that an optical axis of the reflected light in the light receiving element is located on the opposite-light-emitter side with respect to a center axis of the reflected light lens.

13. The object detection method according to claim 12, further comprising:
determining whether the object exists in the object sensing limited area based on a light receiving level at the light receiver.

* * * * *